(12) United States Patent
Oh

(10) Patent No.: US 7,894,866 B2
(45) Date of Patent: *Feb. 22, 2011

(54) SLIDING-TYPE PORTABLE TERMINAL

(75) Inventor: Hye-Jung Oh, Seoul (KR)

(73) Assignee: Samsung Electronics Co., Ltd (KR)

( * ) Notice: Subject to any disclaimer, the term of this patent is extended or adjusted under 35 U.S.C. 154(b) by 460 days.

This patent is subject to a terminal disclaimer.

(21) Appl. No.: 12/020,895

(22) Filed: Jan. 28, 2008

(65) Prior Publication Data

US 2008/0119251 A1   May 22, 2008

Related U.S. Application Data

(62) Division of application No. 11/866,226, filed on Oct. 2, 2007.

(30) Foreign Application Priority Data

Oct. 2, 2006   (KR) ................ 2006-97088

(51) Int. Cl.
   *H04M 1/00* (2006.01)
(52) U.S. Cl. .................................. 455/575.4

(58) Field of Classification Search ............... None
See application file for complete search history.

(56) References Cited

FOREIGN PATENT DOCUMENTS

KR   102006008652   8/2006

*Primary Examiner*—Matthew D Anderson
*Assistant Examiner*—Gennadiy Tsvey
(74) *Attorney, Agent, or Firm*—The Farrell Law Firm, P.C.

(57) ABSTRACT

A portable terminal includes a first housing and a second housing combined with the first housing while facing the first housing. The second housing translates about an axis perpendicular to a top face of the first housing while facing the first housing, thereby sequentially opening portions of the first housing and sequentially closing already opened portions of the first housing, thereby increasing diversification in use of the portable terminal. Portions of the first housing are sequentially opened or closed, thereby allowing a user to select a position of the second housing according to a desired function such as voice communication, mail writing, or broadcasting watching.

11 Claims, 22 Drawing Sheets

SLIDING-TYPE PORTABLE TERMINAL

PRIORITY

This application is a Divisional Application of U.S. patent application Ser. No. 11/866,226, filed in the U.S. Patent and Trademark Office on Oct. 2, 2007, and this application claims priority under 35 U.S.C. §119 to an application filed in the Korean Intellectual Property Office on Oct. 2, 2006 and assigned Serial No. 2006-97088, the contents of which are incorporated herein by reference.

BACKGROUND OF THE INVENTION

1. Field of the Invention

The present invention generally relates to a portable terminal, and in particular, to a sliding-type portable terminal in which a pair of housings are slidably combined with each other.

2. Description of the Related Art

Generally, a portable terminal refers to an apparatus for providing a mobile communication function to users. Recently, the portable terminal has been used not only as a simple mobile communication apparatus but also as a multi-function apparatus that provides a multimedia service such as reproduction of music files and moving picture files and a financial service such as retail payment and mobile banking.

Portable terminals can be classified into bar-type terminals, flip-type terminals, and folder-type terminals according to their appearance. Recently emerging sliding-type terminals, together with the folder-type terminals, become mainstream in the portable terminal market.

The bar-type terminal has a single housing in which data input/output means, a transmitting unit (or mouthpiece), and a receiving unit (or earpiece) are mounted. The bar-type terminal is simple because all the components for a mobile communication function are installed in the single housing. However, there are limitations on miniaturization of the bar-type terminal because a sufficient distance should be maintained between the transmitting unit and the receiving unit.

In the flip-type terminal, a flip cover is rotatably mounted in a bar-shaped terminal to prevent malfunctioning by closing an input device like a keypad in a call standby mode. However, there are also limitations on miniaturization of the flip-type terminal because a sufficient distance should be maintained between a transmitting unit and a receiving unit.

In the folder-type terminal, a pair of housings are foldably combined with each other. An input device and an output device are separately disposed in the housings, thereby contributing miniaturization of the terminal and making it easy to secure a distance between a transmitting unit and a receiving unit. For these reasons, the folder-type terminal has become mainstream in the portable terminal market for a long period of time.

The sliding-type terminal has a pair of housings that are slidably combined with each other. An input device and an output device are separately disposed in the housings and a keypad as the input device is opened or closed by sliding of the housings, thereby preventing malfunction of the input device, facilitating the use of the terminal, and contributing to miniaturization of the terminal. For these reasons, the sliding-type terminal is gradually taking over the folder-type terminal market.

However, conventional sliding-type portable terminals are opened or closed simply horizontally or vertically. As a result, the sliding-type portable terminal has limitations in allowing the user to easily use functions of portable terminals which are gradually diversified. In other words, a mobile communication service using a portable terminal expands from voice communication and short message transmission to moving picture watching, broadcasting watching, the wireless Internet, games, and mobile banking. However, since conventional portable terminals are opened or closed by straight movement, they are suitable for one of the mobile communication services but may be inconvenient for other services or functions. For example, a terminal that is opened or closed by vertical sliding is suitable for voice communication, but is inconvenient for broadcasting watching or game playing. Moreover, a terminal that is opened or closed by horizontal sliding is suitable for broadcasting watching or game playing, but is inconvenient for functions that require many key-manipulation steps like message transmission and mail writing.

SUMMARY OF THE INVENTION

It is, therefore, an object of the present invention to provide a sliding-type portable terminal that allows a user to conveniently use various functions of the terminal.

It is another object of the present invention to provide a sliding-type portable terminal that can be opened suitably for a function to be used by diversifying a sliding opening/closing structure.

According to one aspect of the present invention, there is provided a portable terminal including a first housing and a second housing combined with the first housing while facing the first housing. The second housing translates, i.e. slides, about an axis perpendicular to a top face of the first housing while facing the first housing, thereby sequentially opening portions of the top face of the first housing and sequentially closing already opened portions.

According to another aspect of the present invention, there is provided a portable terminal including a first housing, a second housing combined with the first housing while facing the first housing, a guide groove having a polygonal locus formed in one face of the second housing, a support protrusion formed in an area surrounded by the guide groove, a guide plate mounted in an inner side face of the second housing, a guide protrusion protruding from one face of the first housing to be engaged with the guide groove and sliding within the guide groove, and an elastic member whose one end is supported by the guide protrusion and the other end is supported by the support protrusion. The elastic member provides a driving force for moving the guide protrusion to a vertex portion of the locus of the guide groove and the second housing translates about an axis perpendicular to a top face of the first housing while facing the first housing, thereby sequentially opening portions of one face of the first housing and sequentially closing already opened portions.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Preferred embodiments of the present invention will now be described in detail with reference to the annexed drawings. In the following description, a detailed description of known functions and configurations incorporated herein has been omitted for conciseness.

Figure 1:
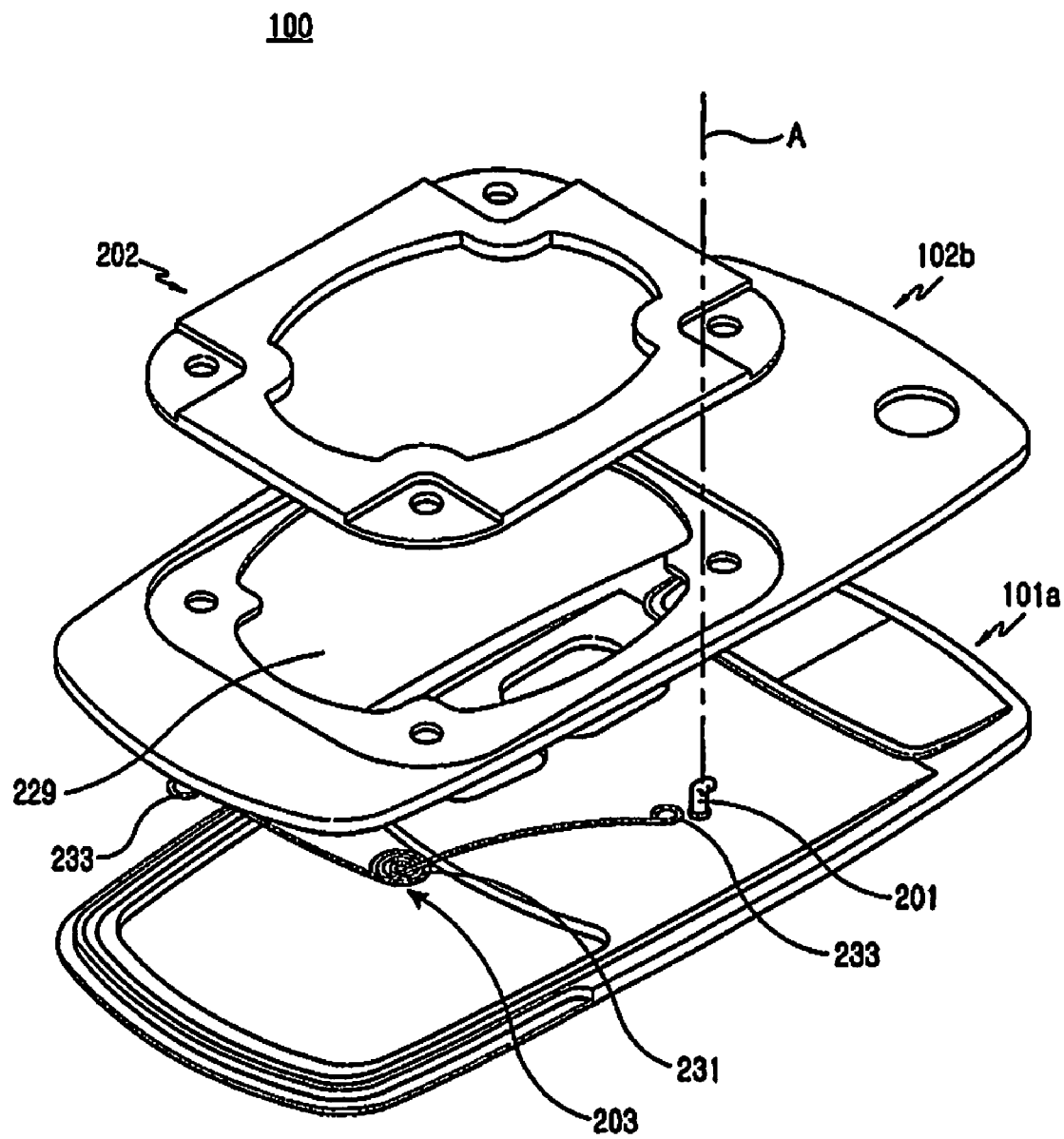
FIG. 1 is an exploded perspective view of a portable terminal according to the present invention.
Figure 2:
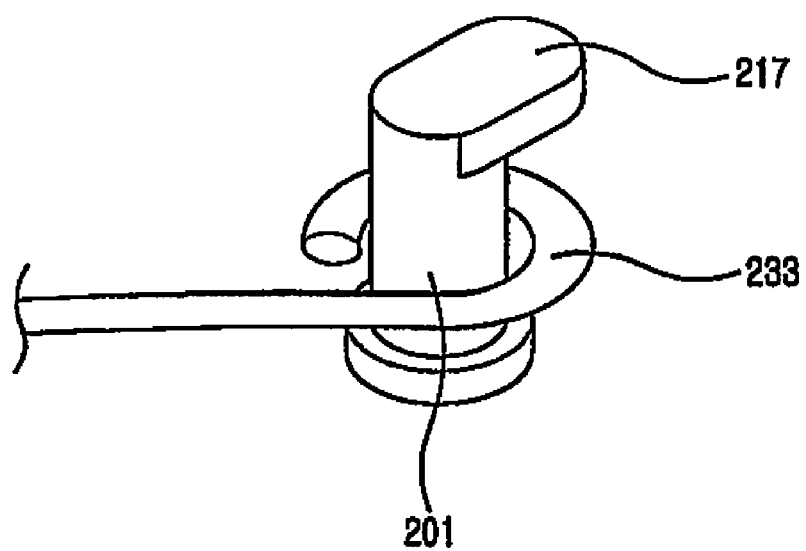
FIG. 2 is a perspective view showing a state in which an elastic member shown in FIG. 1 is supported by a guide protrusion.
Figure 3:
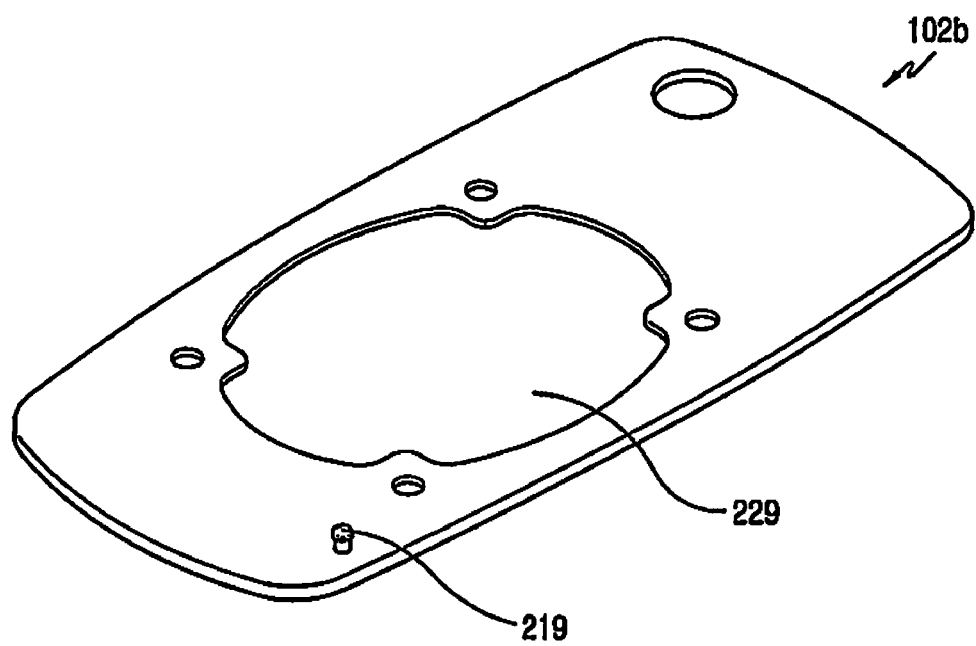
FIG. 3 is a perspective view of a face of a second housing shown in FIG. 1.
Figure 4:
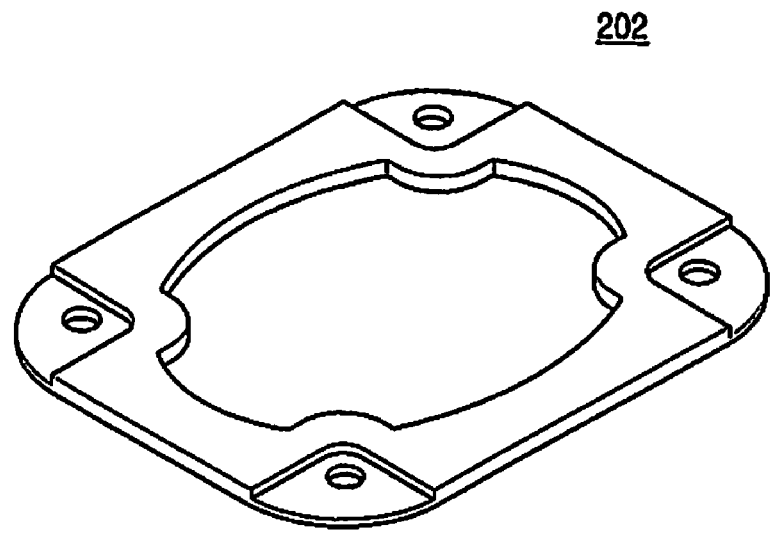
FIG. 4 is a perspective view of one face of a guide plate shown in FIG. 1.
Figure 14:
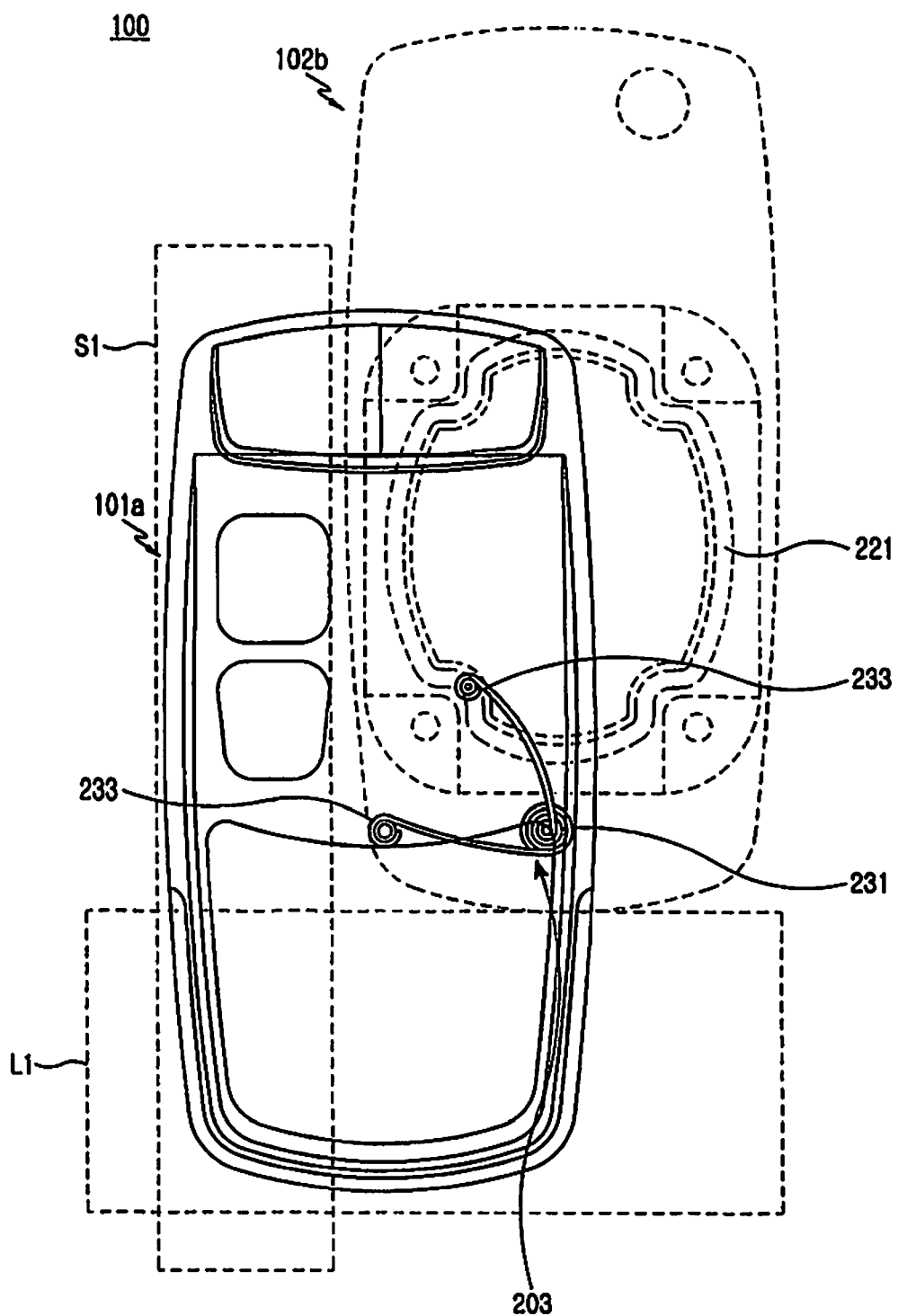
Figure 17:
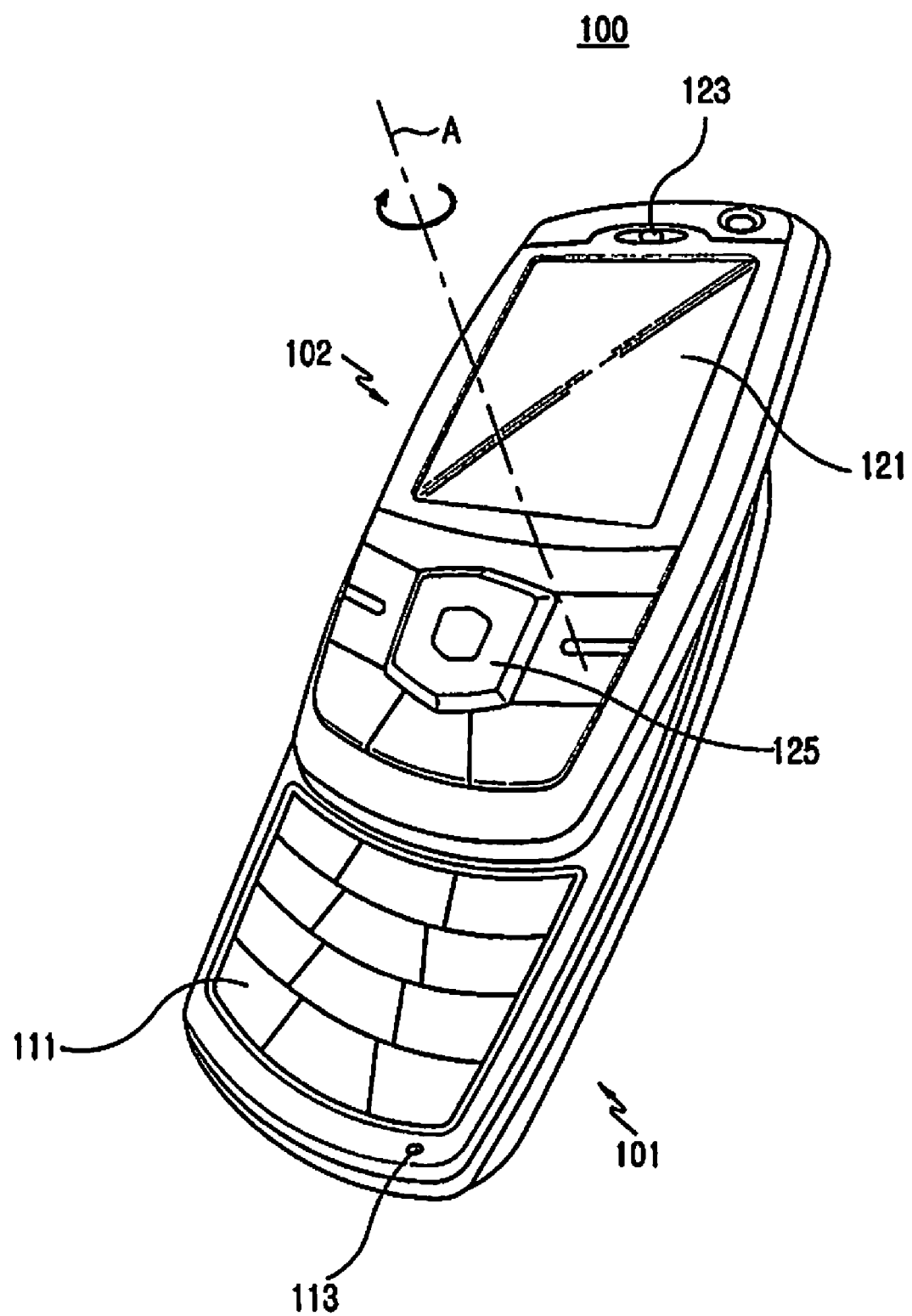
FIG. 17 is a perspective view of a portable terminal shown in FIG. 1.

Referring to FIGS. 1, 14 and 17, in a portable terminal 100 according to the present invention, a second housing 102 combined with a first housing 101 in opposition to each other translates about an axis A, thereby sequentially opening and closing some portions (L1 and S1 of FIG. 14) on a top face of the first housing 101. It should be noted that only a front case 101a of the first housing 101 and a back case 102b of the second housing 102 are shown to show a combined structure of the first housing 101 and the second housing 102.

The axis A is perpendicular to a top face of the first housing 101 and the second housing 102 translates about the axis A while facing the first housing 101. Since the axis A is positioned off the center of the top face of the first housing 101, some portions L1 and S1 of the top face of the first housing 101 are sequentially opened or closed by translation of the second housing 102.

Referring to FIGS. 14 and 17, the first housing 101 has a main board (not shown) embedded therein and a keypad 111 and a transmitting unit 113 are installed in a lower portion L1 of the top face. Moreover, function keys or a speaker device may be installed in an other side portion S1 of the top face of the first housing 101.

Figure 15:
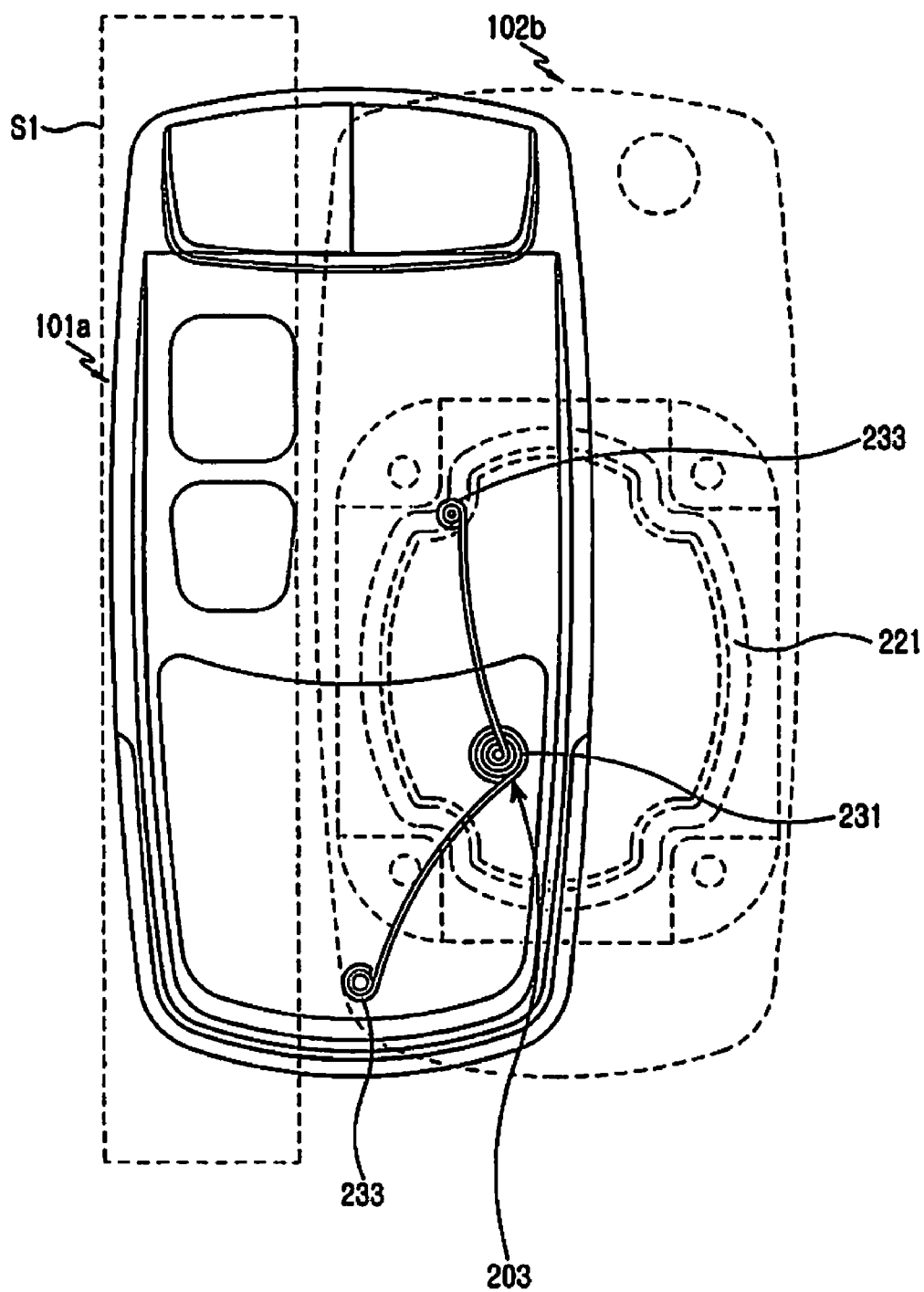
Figure 16:
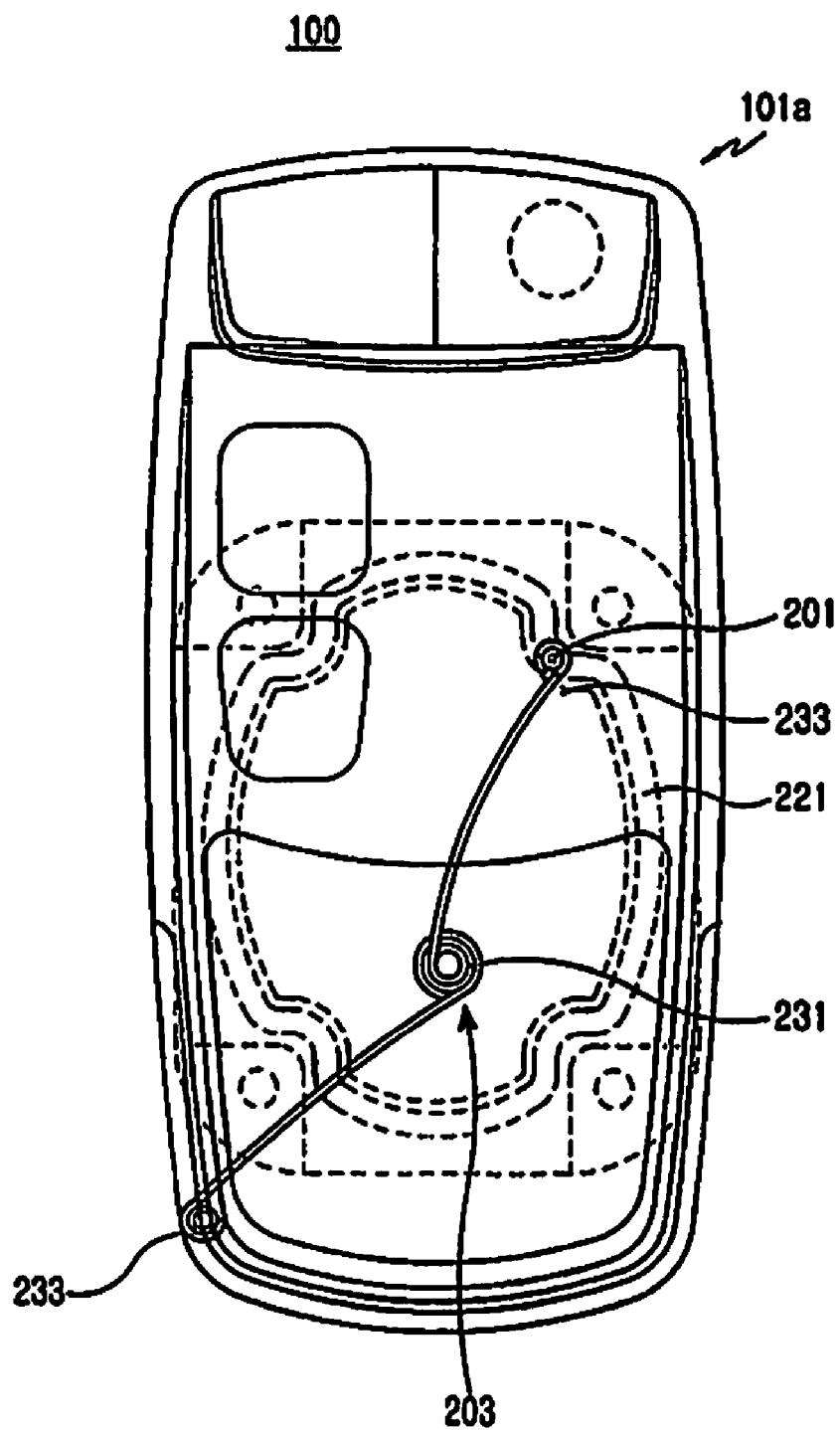

A display device 121, a receiving unit 123, and a function keypad 125 are installed in the second housing 102. While translating about the axis A from a first position wherein the second housing 102 completely covers the top face of the first housing 101 (FIG. 11), the second housing 102 is stopped sequentially in a second position in an upper portion of the top face to expose a lower portion L1 of the top face (FIG. 13), a third position in a diagonal direction from the first position to expose both a side portion S1 and the portion L1 of the top face (FIG. 14), and a fourth position in a side of the first housing 101 to expose the portion S1 (FIG. 15). The second housing 102 can translate about the axis A from the fourth position back to the first position (FIG. 16). FIG. 12 shows the second housing 102 in transience during translation between the first and second positions. The lower portion L1 and the other side portion S1 are sequentially opened or closed according to the stopped position of the second housing 102.

Since the second housing 102 overlaps with the first housing 101 in the first position, the top face of the first housing 101 is maintained completely closed. When the second housing 102 translates about the axis A to move from the first position to the second position, the lower portion L1 of the first housing 101 is opened and the side portion S1 is maintained closed. When the second housing 102 translates about the axis A to move from the second position to the third position, the lower portion L1 and the side portion S1 of the first housing 101 are opened at the same time. At this time, the lower portion L1 and the other side portion S1 partially overlap with each other. When the second housing 102 translates about the axis A to move from the third position to the fourth position, the side portion S1 of the first housing 101 is opened and the lower portion L1 of the first housing 101 is closed.

Although a portion of the side portion S1 which overlaps with the lower portion L1 is opened when the second housing 102 is stopped in the second position, it is assumed that only the lower portion L1 is opened. Similarly, although a portion of the lower portion L1 which overlaps with the other side portion S1 is opened when the second housing 102 is in the fourth position, it is assumed that only the other side portion S1 is opened. In other words, in explanation of an embodiment of the present invention, it is assumed that if any part of the lower portion L1 or the side portion S1 is closed by the second housing 102, the portion is considered completely closed by the second housing 102.

In the second position (FIG. 13), the second housing 102 is positioned in the upper portion of the first housing 101 and longitudinally aligned with the first housing 101. The keypad 111 and the transmitting unit 113 of the lower portion L1 are opened to allow the user to perform voice communication and short message writing and transmission.

In the third position (FIG. 14), the second housing 102 is positioned in the diagonal direction of the side of the upper portion of the first housing 101 and the lower portion L1 and the other side portion S1 are opened at the same time to allow the user to perform various functions. In other words, if a function keypad is installed in the side portion S1, the user can rapidly input a large amount of data by manipulating keys of the function keypad together with keys of the keypad 111. In addition, if a speaker device is installed in the side portion S1, the user can be provided with rich sound when enjoying moving pictures and broadcasting programs through the sliding-type portable terminal 100.

In the fourth position (FIG. 15), the second housing 102 is positioned in a side of the first housing 101 and latitudinally aligned with the first housing 101. The side portion S1 is opened. At this time, since only part of the keypad 111 is opened, key manipulation is partially restricted and the user can conveniently enjoy moving picture watching, broadcasting watching, and simple shooting games.

The second housing 102 in the fourth position may translate about the axis A to move directly to the first position or move to the first position after passing through the third position and then the second position.

When the first housing 101 and the second housing 102 are slidably combined with each other, the second housing 102 translates about the axis A to sequentially open or close some portions of the first housing 101, thereby allowing the user to conveniently use various functions suitable for the opened or closed states.

Hereinafter, an embodiment of a structure in which the first housing 101 and the second housing 102 are slidably combined with each other will be described.

Figure 7:
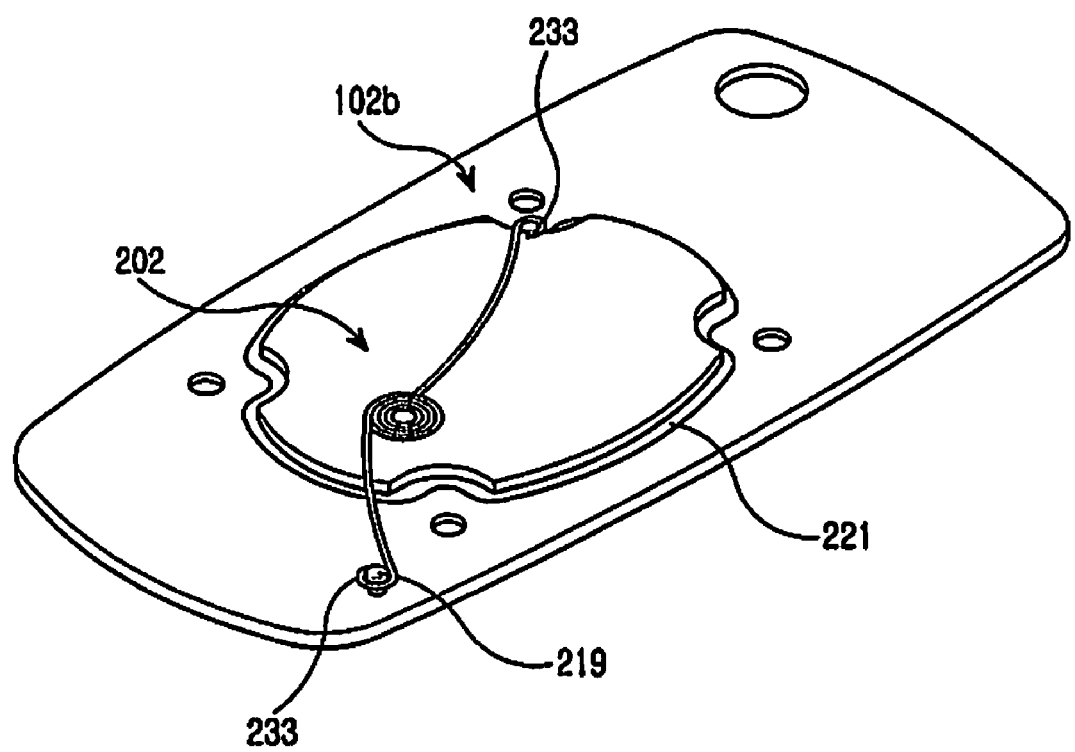
FIG. 7 is a perspective view showing a state in which an elastic member shown in FIG. 1 is supported by a second housing.
Figure 8:
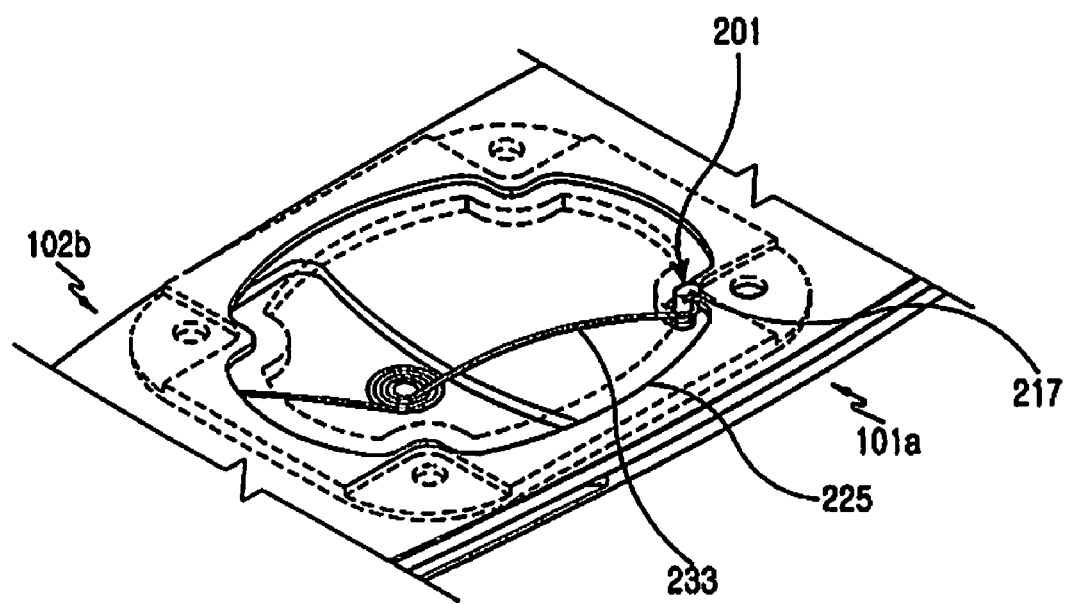
FIG. 8 is a perspective view showing a state in which a guide protrusion shown in FIG. 1 is connected with a second housing.

Referring to FIGS. 1 and 7, the first housing 101 includes a guide protrusion 201 on a top face of the first housing 101 and the second housing 102 includes a guide groove 221 having a curved locus on a bottom face of the second housing 102, opposite to the top face of the first housing 101.

Figure 9:
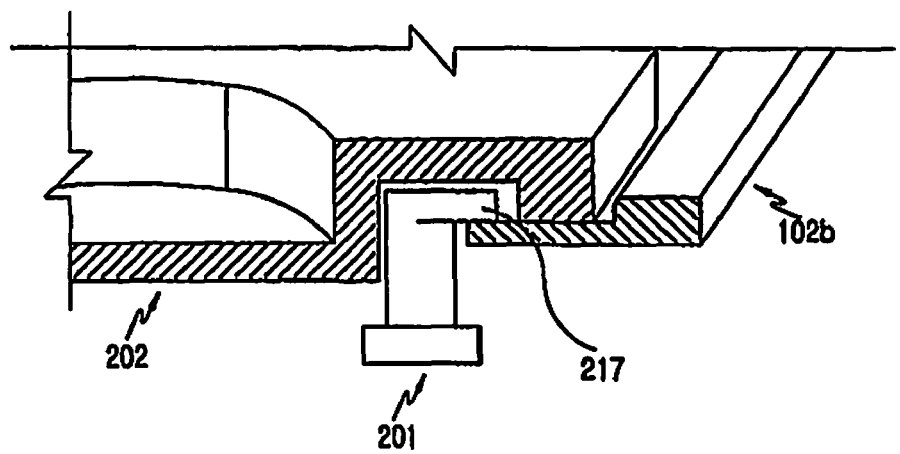
FIG. 9 is a cut perspective view showing a state in which a guide protrusion shown in FIG. 8 is connected with a second housing.
Figure 10:
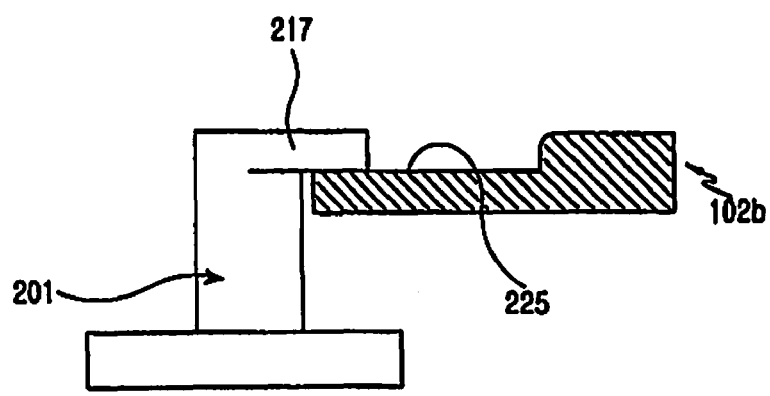
FIG. 10 is a view for a state in which a guide protrusion shown in FIG. 8 is connected with a second housing.

Referring to FIGS. 2 and 8 through 10, the guide protrusion 201 includes a connection rib 217 that extends from an outer circumference of a free end of the guide protrusion 201. The connection rib 217 is positioned within the guide groove 221 to face an inner face 225 of the second housing 102 (FIGS. 9 and 10). Thus, the second housing 102 is prevented from deviating in the direction of the axis A when being combined with the first housing 101. In other words, the second housing 102 can slide while being maintained connected with the first housing 101 by the connection rib 217 formed in the guide protrusion 201.

Referring to FIGS. 3 through 6, the second housing 102 includes a guide plate 202 combined to the back case 102b of the second housing 102 and the guide groove 221 is formed in the guide plate 202.

An opening 229 is formed in the back case 102b of the second housing 102 to provide a space for mounting the guide plate 202 and a support protrusion 219 is formed adjacent to the opening 229 on a top face of the back case 102b.

The guide groove 221 is formed on a top face of the guide plate 202, and is exposed to a top face of the second housing 102 when the guide plate 202 is mounted in the inner face of the second housing 102. The guide groove 221 has a curved locus, and the guide groove 221 formed in the sliding-type portable terminal according to the present invention has a closed-curve locus that is almost a circle. At least two pairs of stopper grooves 223 are formed in the guide groove 221. The guide groove 221 protrudes at a plurality of places, thereby providing the stopper grooves 223.

The stopper grooves 223 are curved towards the inner side of the guide groove 221. In other words, the stopper grooves 223 are inner corner portions of the guide groove 221 that are hollowed out towards the inner side of the guide groove 221.

When the guide plate 202 is mounted in the second housing 102, the opening 229 of the back case 102b is closed and the guide groove 221 is exposed to the outside of the second housing 102. A portion of an outer circumference 221a of the guide groove 221 is closed by the second housing 102 and the inner face 225 of the second housing 102 which closes the portion of the outer circumference 221a of the guide groove 221 faces the connection rib 217.

Since the guide plate 202 is mounted in a state where the connection rib 217 faces the inner face 225 of the second housing 102, the second housing 102 can slide while being connected with the first housing 101 and the guide protrusion 201 slides within the guide groove 221.

Although the guide plate 202 is described as being separately from the back case 102b of the second housing 102, the guide plate 201 may also be formed integrally with the back case 102b of the second housing 102 as long as the second housing 102 can be prevented from deviating in the direction of the rotation axis A. In other words, the guide groove 221 may also be formed in the back case 102b of the second housing 102.

Referring back to FIG. 8, after the back case 102b of the second housing 102 is combined with the front case 101a of the first housing 101, the guide plate 202 is mounted in the opening 229 of the second housing 102. If the guide plate 202 is mounted in a state where the front case 101a and the back case 102b are combined with each other, the guide protrusion 201 is positioned in the guide groove 221 and thus the connection rib 217 can keep facing the inner face 225 of the second housing 102.

When the first housing 101 and the second housing 102 are combined with each other, the second housing 102 translates about the axis A by sliding along the locus of the guide groove 221. In other words, the sliding locus of the second housing 102 is determined by the locus of the guide groove 221.

The sliding-type portable terminal 100 may include an elastic member 203 that provides a driving force and a stopping force during sliding of the second housing 102. When the second housing 102 slides, the guide protrusion 201 slides along the guide groove 221 or is engaged with the stopper groove 223.

When the guide protrusion 201 is engaged with the stopper groove 223, the elastic member 203 provides the stopping force for stopping sliding of the second housing 102. When the guide protrusion 201 slides off the stopper groove 223, the elastic member 203 provides the driving force for sliding the guide protrusion 201 in a direction that tends to engage the guide protrusion 201 with one of the stopper grooves 223. The second housing 102 is maintained stopped by an elastic force of the elastic member 203 or is provided with the driving force while sliding.

Referring to FIGS. 1, 2, 7, and 8, the elastic member 203 includes a coil unit 231 and a pair of free ends 233 that extend from the coil unit 231 in a direction away from each other. Each of the free ends 233 engages one of the guide protrusion 201 and the support protrusion 219, thereby providing the stopping force or the driving force. The free ends 233 are combined with each other to surround the guide protrusion 201 or the support protrusion 219 and thus rotate with respect to the guide protrusion 201 or the support protrusion 219.

At this time, if end portions of the free ends 233 are away from each other more than a predetermined distance, the elastic member 203 accumulates an elastic force working in a direction that tends to move the end portions of the free ends 233 towards each other. If the end portions of the free ends 233 move towards each other within a predetermined distance, the elastic member 203 accumulates an elastic force working in a direction that tends to make the end portions of the free ends 233 away from each other. The second housing 102 maintains a stable stopped state by the elastic force of the elastic member 203 and can be provided with a driving force during sliding. The structure of the elastic member 203 will be described in more detail based on sliding of the second housing 102.

Hereinafter, an operation in which the second housing 102 translates about the axis A to open or close the first housing 101 will be described with reference to FIGS. 11 through 16.

Figure 11:
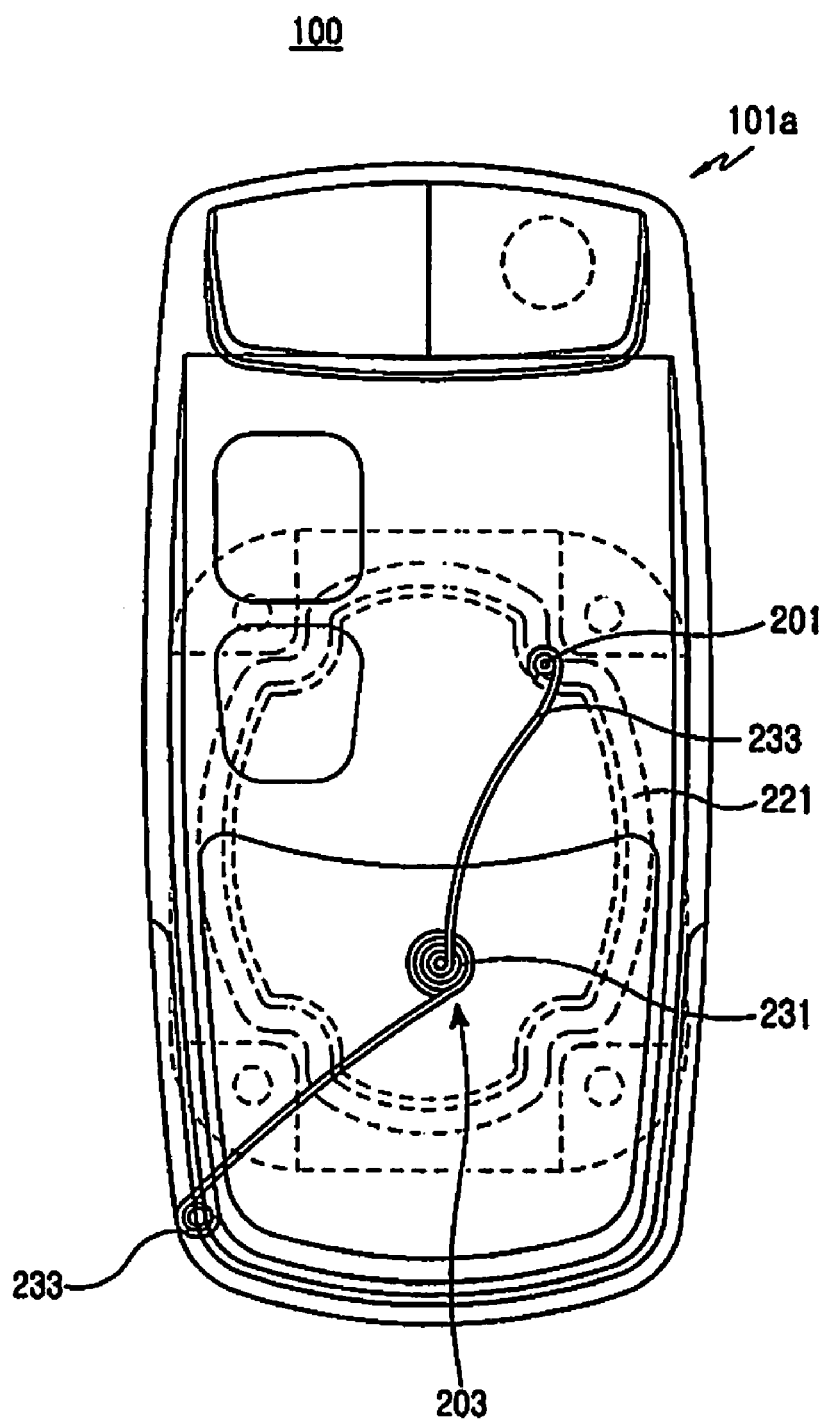
FIGS. 11 through 16 are views sequentially showing a state in which a second housing shown in FIG. 1 slides from a first housing.
Figure 12:
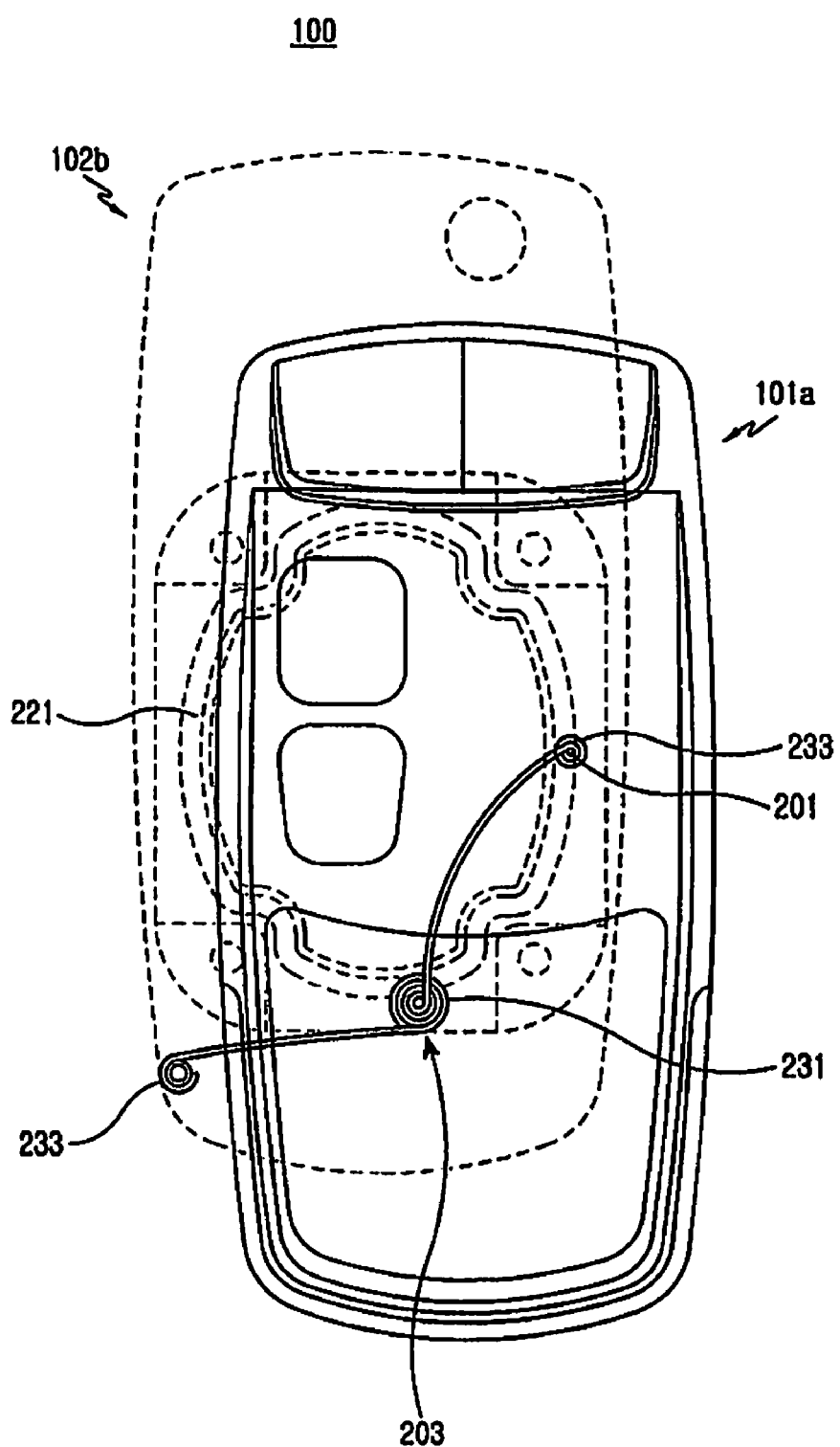

FIG. 11 shows a state in which the second housing 102 is stopped in the first position to completely close the first housing 101. In the first position, the guide protrusion 201 is in the first stopper groove 223 among the stopper grooves 223. At this time, the elastic member 203 accumulates an elastic force working in a direction that tends to move the free ends 233 towards each other. The guide protrusion 201 keeps being engaged with the first stopper groove 223.

Figure 13:
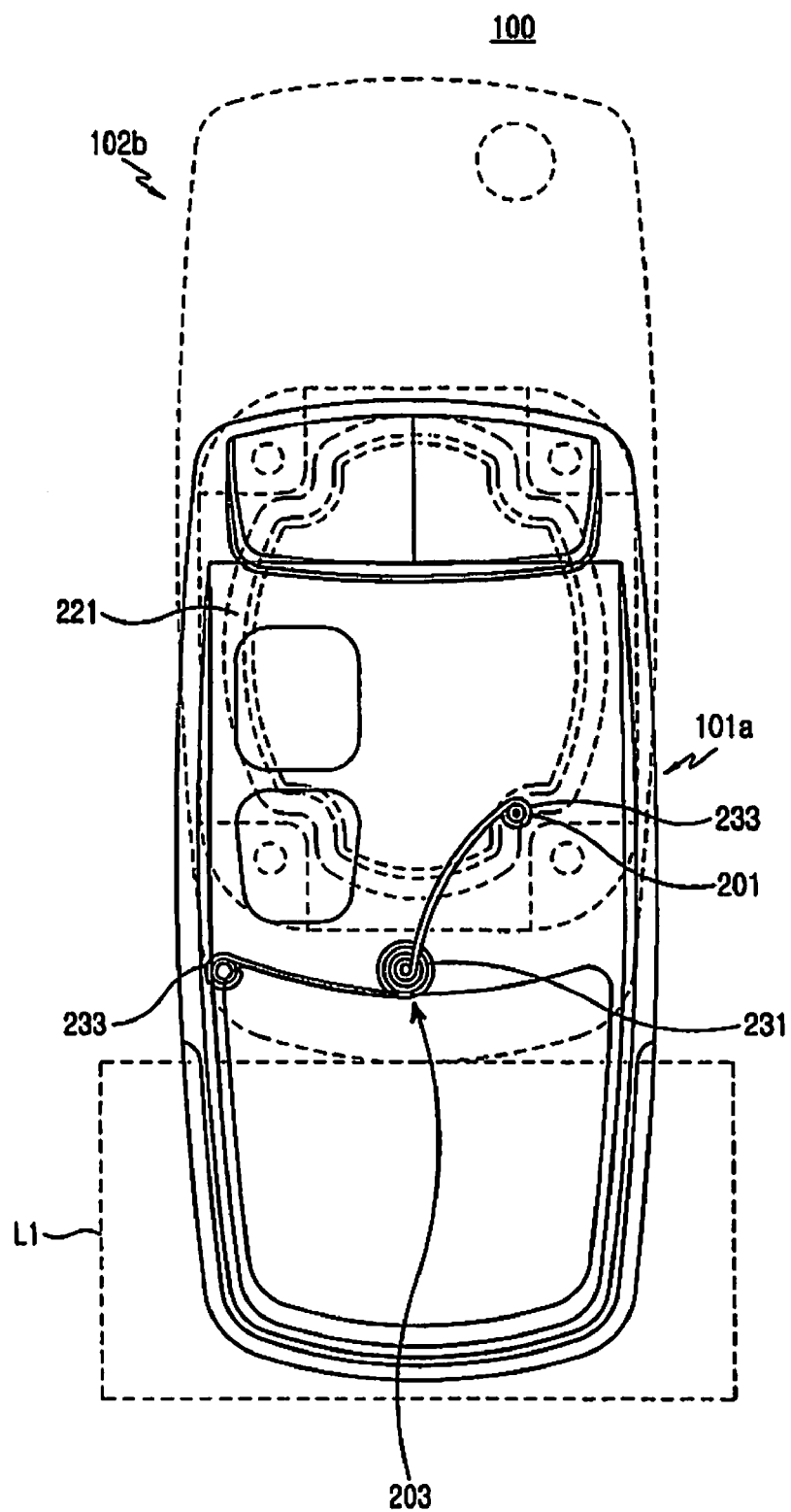

FIGS. 12 and 13 sequentially show states in which the second housing 102 is in the first position and then translates to the second position. If the user slides the second housing 102 in the first position clockwise to open the lower portion L1 of the first housing 101, the guide protrusion 201 slides off the first stopper groove 223 and slides along the guide groove 221. When the second housing 102 is in the second position, the guide protrusion 201 is engaged with the second stopper groove 223 among the stopper grooves 223. When the guide protrusion 201 is engaged with the second stopper groove 223, the elastic member 203 accumulates the elastic force working in a direction that tends to move the free ends 233 towards each other and thus causes the second housing 102 to maintain a stable stopped state in the second position. When the guide protrusion 201 slides off the first stopper groove 223, the elastic member 203 provides the driving force for rotating the second housing 102 clockwise. Thus, when the guide protrusion 201 slides off the first stopper groove 223, the second housing 102 slides to the second position by the driving force of the elastic member 203.

Further referring to FIG. 17, when the second housing 102 is stopped in the second position, the lower portion L1 of one face of the first housing 101 is opened to allow the user to input a partner's phone number or a short message using the keypad 111 and the transmitting unit 113 is also opened to allow the user to perform voice communication.

When the second housing 102 translates from the first position to the second position, the free ends 233 of the elastic member 203 are bent in a direction that their end portions are away from each other. When each of the free ends 233 is bent in one direction, it tends to maintain a straight-line state. As a result, when the second housing 102 translates from the first position to the second position, the free ends 233, together with the coil unit 231, provide an elastic force working in a direction that tends to move the end portions of the free ends 233 towards each other. Thus, the second housing 102 is provided with the elastic force of the elastic member 203 and thus translates from the first position to the second position along the locus of the guide groove 221.

FIG. 14 shows a state in which the second housing 102 translates clockwise from the second position to the third position. When the second housing 102 is in the third position, both the lower portion L1 and the other side portion S1 of one face of the first housing 101 are opened to allow the user to conveniently input a large amount of information and use other functions like broadcasting watching as well as a communication function. If a speaker device is installed in the other side portion S1, the user can be provided with rich sound during moving picture watching and broadcasting watching.

When the second housing 102 is in the third position, the end portions of the free ends 233 are bent towards each other and the free ends 233 accumulate an elastic force working in a direction that tends to make the end portions of the free ends 233 away from each other. In this way, the guide protrusion 201 can be maintained engaged with the third stopper groove 223 among the stopper grooves 223.

When the second housing 102 translates from the second position to the third position, the free ends 233 move towards each other and a direction that the elastic force of the elastic member 203 works is converted into a direction away from the direction that tends to move the end portions of the free ends 233 towards each other. Since the direction that the elastic force of the elastic member 203 works is changed, it is preferable that the user directly move the second housing 102 from the second position to the third position.

FIG. 15 shows a state in which the second housing 102 translates clockwise from the third position to the fourth position. When the second housing 102 is in the fourth position, the second housing 102 opens the other side portion S1 of the first housing 101 and closes the lower portion L1 of the first housing 101. At this time, the guide protrusion 201 is engaged with the fourth stopper groove 223 among the stopper grooves 223. When the second housing 102 is in the fourth position, the end portions of the free ends 233 are bent away from each other. In other words, the elastic member 203 accumulates an elastic force working in a direction that tends to move the end portions of the free ends 233 towards each other. Thus, the guide protrusion 201 is maintained engaged with the fourth stopper groove 223.

When the second housing 102 is in the fourth position, some of the function keys or the speaker device installed in the other side portion S1 and a portion of the keypad 111 are exposed, thereby allowing the user to conveniently enjoy broadcasting watching or simple shooting games.

When the second housing 102 translates from the third position to the fourth position, a direction that the elastic force of the elastic member 203 works is changed and thus it is preferable that the user directly slides the second housing 102 from the third position to the fourth position.

If the user desires to close the first housing 101 when the second housing 102 is in the fourth position, the user may slide the second housing 102 to the first position. FIG. 16 shows a state in which the second housing 102 translates back to the first position. The second housing 102 may translate clockwise from the fourth position to the first position or translate counter-clockwise from the fourth position to the third position, the second position and then the first position.

If the first housing 101 and the second housing 102 are electrically connected to each other by a flexible printed circuit, the second housing 102 should not translate clockwise back to the first position from the fourth position because the flexible printed circuit may be overly twisted if the second housing 102 repeats clockwise rotation. Therefore, it is desirable to prevent the second housing 102 from translating in a full ring such as clockwise from the fourth position to the first position by closing at least a portion of a section that is connected directly to the first position from the fourth position.

However, if an interconnection is formed to prevent the flexible printed circuit from being damaged even when the second housing 102 repeats clockwise rotation, the locus of the guide groove 221 may be in a closed-curve shape.

Figure 18:
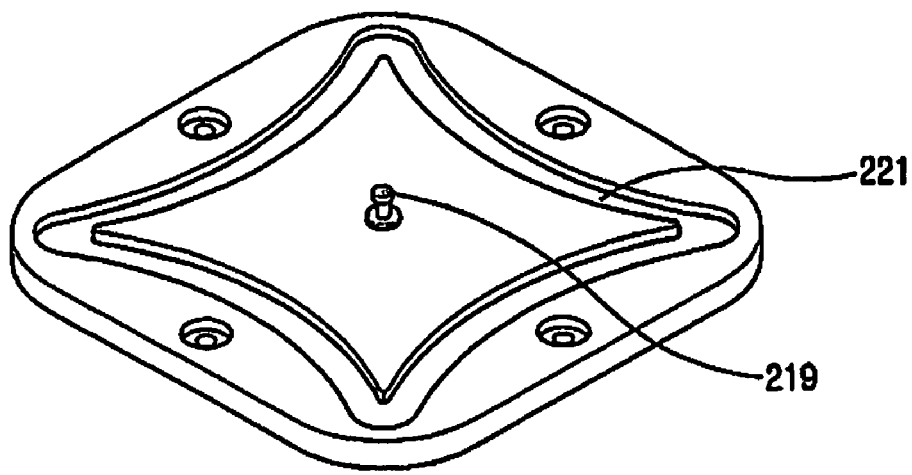
FIG. 18 is a perspective view of another form of a guide plate shown in FIG. 1.

FIG. 18 is a perspective view of another form of the guide plate 202 shown in FIG. 1, and FIGS. 19 through 23 are plan views showing the loci of various shapes of the guide groove 221 formed in the guide plate 202 shown in FIG. 18. The loci of the guide groove 221 in FIGS. 18 through 23 are various examples that cause the second housing 102 to translate about the axis A, while facing the first housing 101. Another form of an elastic member may be used according to the locus of the guide groove 221. In addition, the support protrusion 219 for supporting the elastic member is formed on the guide plate 202 within an area surrounded by the guide groove 221.

In detailed description of various examples of the guide plate 202, it should be noted that elements that function in the same manner as, although operating in a different manner than, those described in the foregoing embodiment of the present invention will be assigned identical reference numbers or will not be assigned any reference number.

Figure 19A:
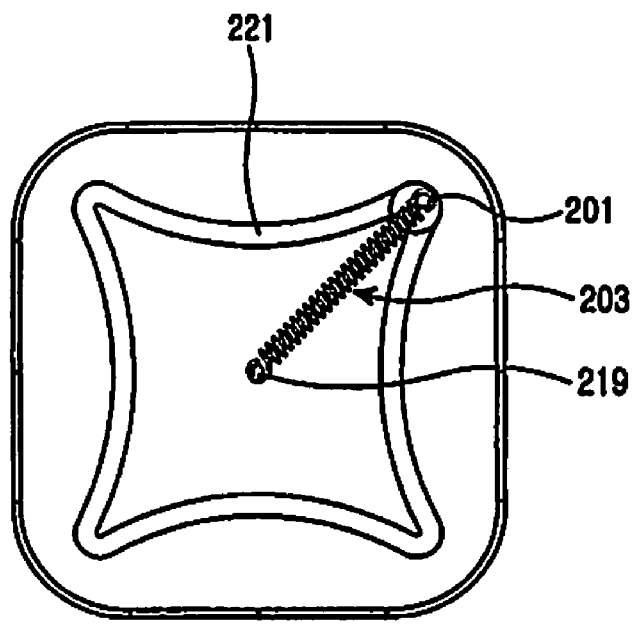
FIGS. 19 through 23 are plane views showing various shapes of a guide groove formed in a guide plate shown in FIG. 18.
Figure 19B:
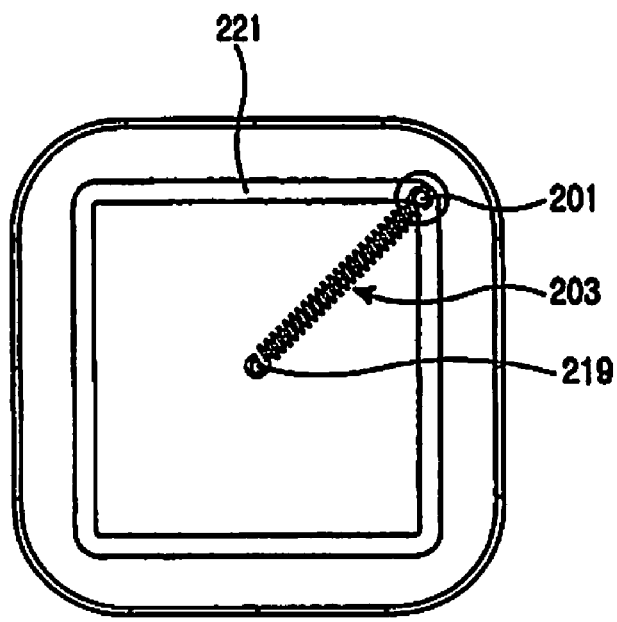

Referring to FIGS. 18, 19A and 19B, the locus of the guide groove 221 is in a square shape having four vertexes. In FIGS. 18 and 19A, the locus of the guide groove 221 between two vertexes is in a curved shape.

The guide protrusion 219 is surrounded by the locus of the guide groove 221 and is positioned in the center of the locus of the guide groove 221. The elastic member 203 is supported by the guide protrusion 201 engaged with the guide groove 221 and the support protrusion 219 to provide the elastic force working in a direction that tends to move both ends of the elastic member 203 away from each other. Thus, when the guide protrusion 201 moves along the guide groove 221, the guide protrusion 201 moves to one of the vertexes of the guide groove 221 by the elastic force of the elastic member 203.

The guide groove 221 shown in FIG. 19A has a locus in an arch shape that is curved towards the inner side of the guide groove 221 between every two vertexes. The guide groove 221 shown in FIG. 19B has a locus in a square shape. The guide groove 221 having the locus in the arch shape curved towards the inner side of the guide groove 221 makes the support protrusion 219 and the guide protrusion 201 closer to each other in the middle of the locus between every two vertexes than the guide groove 221 having the locus in the square shape. Thus, when the same elastic member is used, a larger driving force is generated in the guide groove in the curved shape than in the guide groove in the square shape.

Since the elastic member 203 provides the elastic force working in a direction that tends to move both ends of the elastic member 203 away from each other, when the guide protrusion 201 is positioned between two vertexes of the guide groove 221, a driving force for moving the guide protrusion 201 to the more adjacent vertex is generated.

Referring to FIGS. 19A and 19B, when the guide protrusion 201 is positioned in the top right vertex of the guide groove 221, if the second housing 102 overlaps the first housing 101, the stop position of the second housing 102 is set to the same position as in the foregoing embodiment of the present invention.

Figure 20A:
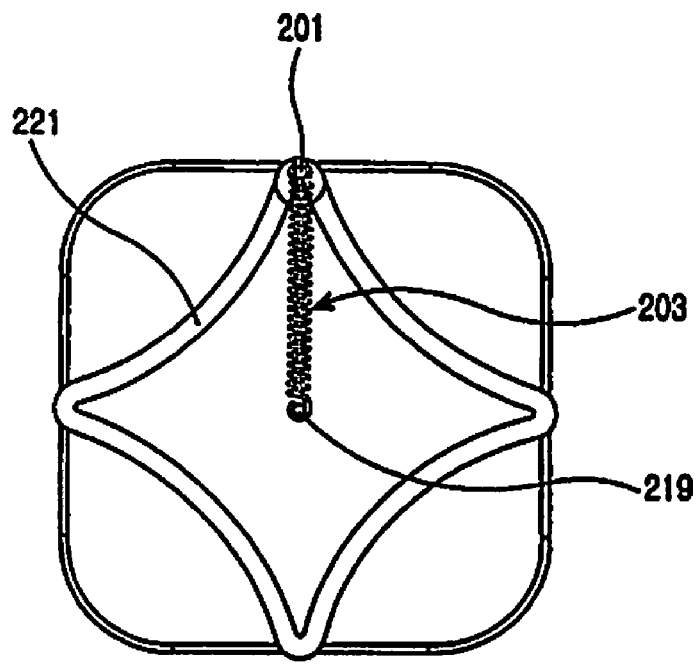
Figure 20B:
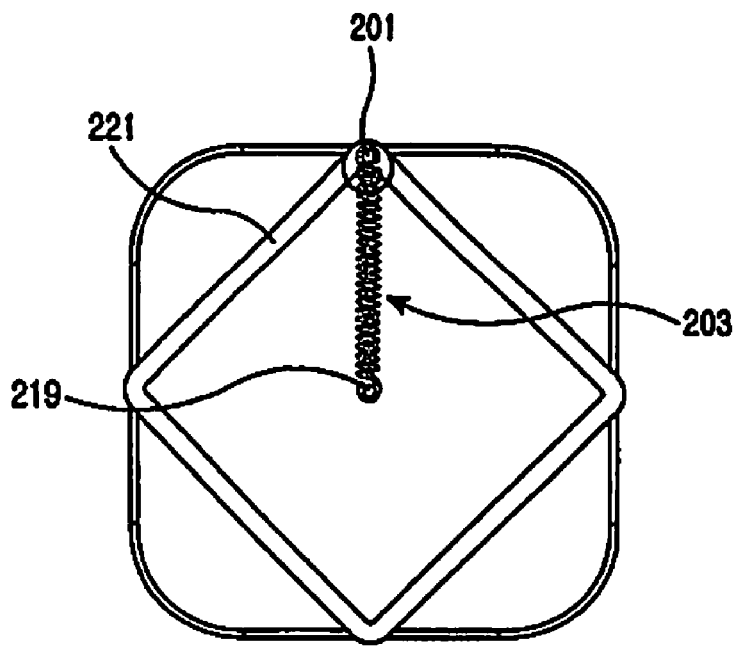

The loci of the guide groove 221 shown in FIGS. 20A and 20B are similar to the loci of the guide groove 221 shown in FIGS. 19A and 19B in that they have four vertexes, but the vertexes are in top, bottom, left, and right positions and thus form a diamond shape. The locus of the guide groove 221 shown in FIG. 20A is curved towards the inner side of the guide groove 221 in the similar manner to the locus of the guide groove 221 shown in FIG. 19A. The elastic members 203 shown in FIGS. 20A and 20B are similar to those shown in FIGS. 19A and 19B in that they provide the elastic force working in a direction that tends to move both ends of the elastic member 203 away from each other.

If the second housing 102 overlaps with the first housing 101 when the guide protrusion 201 is positioned in the top vertex of the guide groove 221 in FIGS. 20A and 20B, the second housing 102 is positioned in the upper left portion of the first housing 101 when the guide protrusion 201 is positioned in the right vertex. When the guide protrusion 201 is positioned in the bottom vertex, the second housing 102 is positioned in the upper portion of the first housing 101, thereby opening the keypad 111. When the guide protrusion 201 is positioned in the left vertex, the second housing 102 is positioned in the upper right portion of the first housing 101, thereby sequentially opening a left portion, a lower portion, and a right portion of the first housing 101 according to the position of the second housing 102.

Figure 21A:
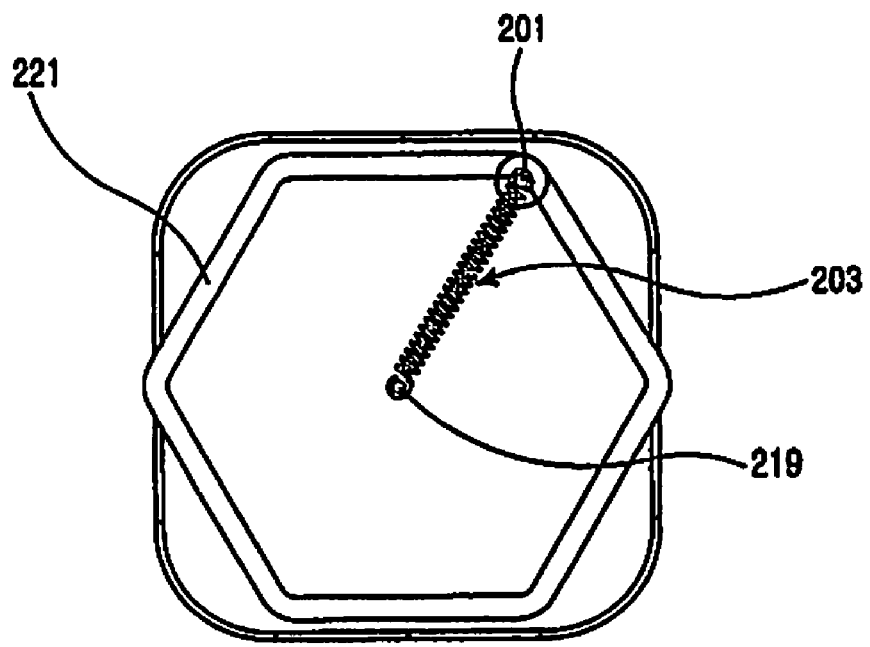
Figure 21B:
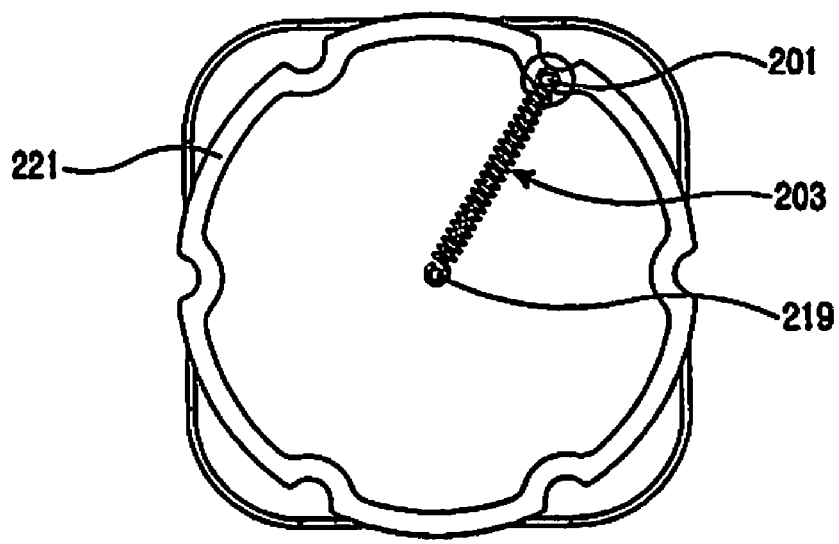

FIGS. 21A and 21B show the loci of the guide groove 221 having six vertexes. In FIG. 21A, the guide groove 221 has a locus in a regular hexagonal shape and the elastic member 203 provides an elastic force working in a direction that tends to move both ends of the elastic member 203 away from each other. If the second housing 102 overlaps the first housing 101 when the guide protrusion 201 is positioned in the upper right vertex of the guide groove 221 shown in FIG. 21A, the second housing 102 moves to the upper left portion of the first housing 101 when the guide protrusion 201 is positioned in the middle right vertex. At this time, the keypad 111 is not completely opened. When the guide protrusion 201 is positioned in the lower right vertex, the second housing 102 is positioned in the upper portion of the first housing 101 and the keypad 111 is completely opened.

When the guide protrusion 201 is positioned in the lower left vertex, the second housing 102 is positioned in the upper right portion of the first housing 101 and the lower portion and the left portion of the first housing 101 are opened. When the guide protrusion 201 is positioned in the middle left vertex, a portion of the keypad 111 is closed and the left portion of the first housing 101 is opened more widely. When the guide protrusion 201 is positioned in the upper left vertex, only the left portion of the first housing 101 is opened and the lower portion of the first housing 101 is closed.

The position of the second housing 102 according to the positions of the vertexes of the locus of the guide groove 221 shown in FIG. 21B is set in the same manner as in FIG. 21A, but the locus of the guide groove 221 and the elastic member 203 shown in FIG. 21B provide an elastic force working in a direction that tends to move both ends of the elastic member 203 towards each other.

The locus of the guide groove 221 shown in FIG. 21B is similar to a circle, in which vertex portions constitute stopper grooves by being curved towards the inner side of the guide groove 221 and the locus between every two stopper grooves is in an arc shape that is curved towards the outer side of the guide groove 221. When the guide protrusion 201 reaches one of the stopper grooves while moving along the guide groove 221, it is engaged with one of the stopper grooves and maintains the engaged state by the elastic force of the elastic member 203.

Figure 22:
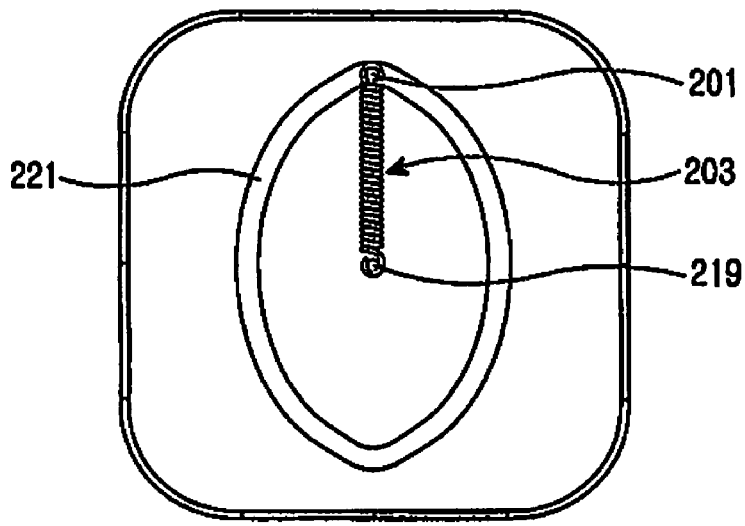
Figure 23:
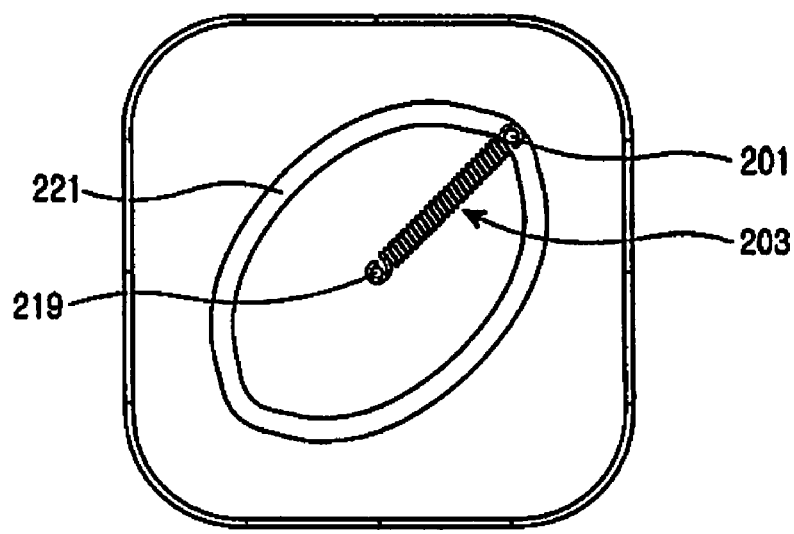

In FIGS. 22 and 23, the guide groove 221 is in a closed-curve shape that connects two stopper grooves with different two paths and thus the guide groove 221 is in an oval shape. The elastic member 203 provides the elastics force working in a direction that tends to move both ends of the elastic member 203 away from each other.

In FIGS. 22 and 23, the stopper grooves protrude outside from the locus of the guide groove 221 and the guide protrusion 201 can maintain a stable stopped state in one of the stopper grooves by being provided with the elastic force. When being positioned in the guide groove 221 between the stopper grooves, the guide protrusion 201 is provided with a driving force for moving the guide protrusion 201 to the next stopper groove.

In FIG. 22, if the second housing 102 closes the first housing 101 when the guide protrusion 201 is positioned in the top stopper groove, the keypad 111 is opened when the guide protrusion 201 is positioned in the bottom stopper groove. At this time, the second housing 102 translates to the upper portion of the first housing 101 along the locus of the guide groove 221.

In FIG. 23, if the second housing 102 closes the first housing 101 when the guide protrusion 201 is positioned in the upper right stopper groove, the second housing 102 is positioned in the upper right portion of the first housing 101 when the guide protrusion 201 is positioned in the lower left stopper groove, thereby opening the lower portion and the left portion of the first housing 101.

As described above, the structures of the guide groove 221 and the elastic member 203 may vary and the axis A is in a position that passes through the support protrusion 219 when the support protrusion 219 is positioned in the center portion of an area surrounded by the guide groove 221.

Figure 24:
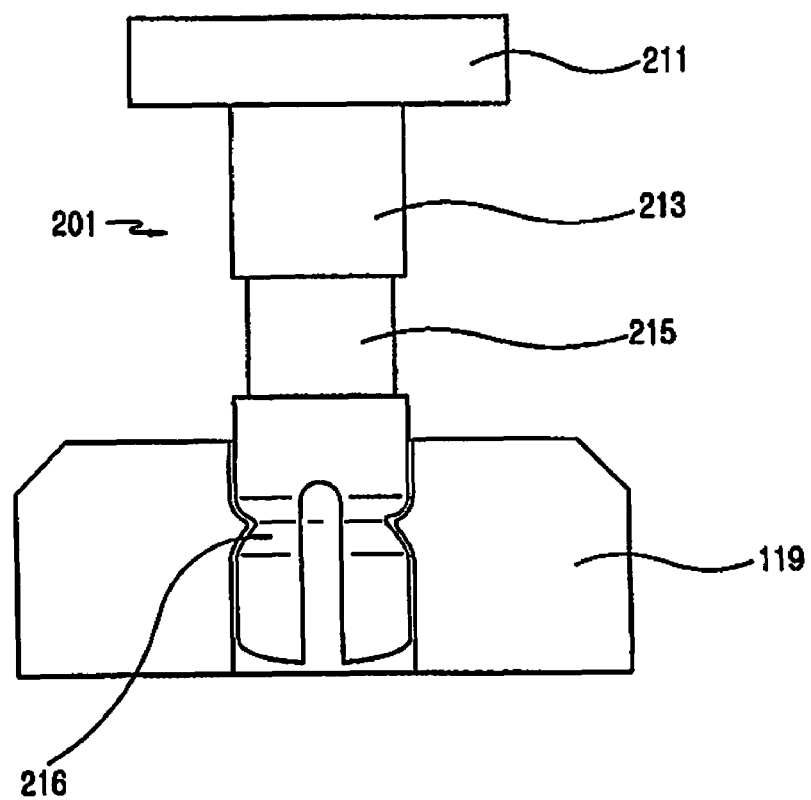
FIG. 24 is a side view showing another form of a guide protrusion shown in FIG. 1.
Figure 25:
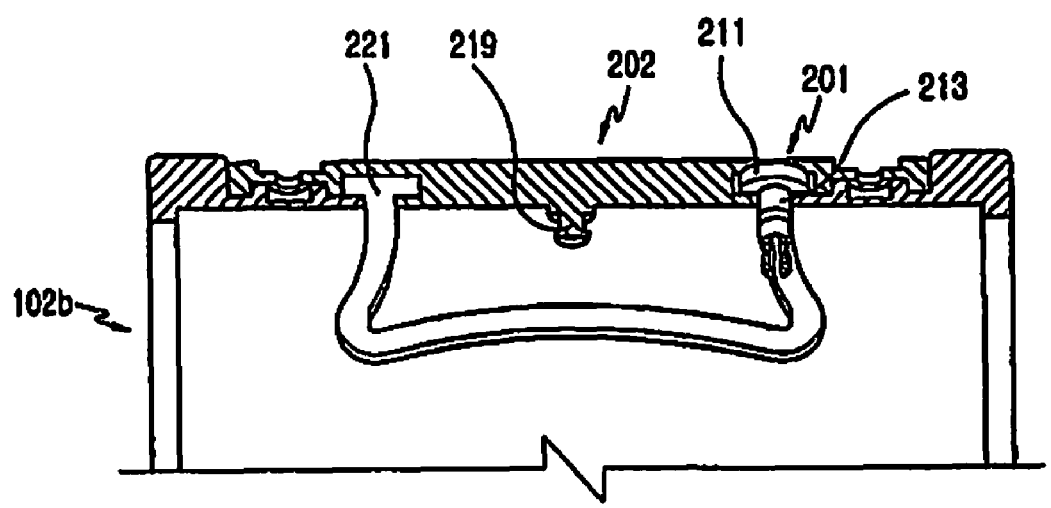
FIG. 25 is a partially-cut perspective view showing a state in which a guide protrusion shown in FIG. 24 is connected with a guide groove.

The guide protrusion 201 shown in FIGS. 18 through 23 is manufactured and assembled separately from the first housing 101 unlike in the foregoing embodiment of the present invention. Referring to FIGS. 24 and 25, the guide protrusion 201 includes a slider 211 sliding within the guide groove 221 and a connection axis 213 extending from the slider 211. A support recess 215 and a combining recess 216 are formed in the outer circumferential face of the connection axis 213.

The slider 211 is positioned within the guide groove 221 and at least both sides of the slider 211 are bounded by the guide groove 221, thereby sliding within the guide groove 221. The connection axis 213 extends from the slider 211 and protrudes from one face of the guide plate 202, and thus an end portion of the connection axis 213 is fixed onto the first housing 101.

The support recess 215 supports one end of the elastic member 203 and the combining recess 216 is fixed onto the first housing 101. To fix the end portion of the connection axis 213 onto the first housing 101, a support member 119 is installed in the first housing 101, the end portion of the connection axis 213 is combined with a hole formed in the support member 119, and the combining recess 216 is bounded by a protrusion formed in the hole of the support member 119.

Since the first housing 101 and the second housing 102 can be assembled with each other by combining the connection axis 213 of the guide protrusion 201 that is combined with the guide plate 202 in such a way to protrude from the guide plate 202 with the support member 119 installed on the first housing 101, the terminal 100 can be easily assembled using the guide protrusion 201 structured as described above.

As described above, the sliding-type portable terminal according to the present invention has a structure in which a second housing translates about an axis perpendicular to a top face of a first housing while facing the first housing, thereby contributing diversification of the sliding-type portable terminal. The second housing sequentially opens one portion and an other portion of the top face of the first housing and sequentially closes already opened portions when the other portion is opened, thereby being located sequentially in first, second, third, and fourth positions. Thus, the user can select a position of the second housing to expose or close a portion of the top face of the first housing according to a desired function such as voice communication, mail writing, or broadcasting watching. Moreover, a stopped position of the second housing can be maintained using the elastic member, thereby improving the structural stability of the terminal.

While the invention has been shown and described with reference to preferred embodiments thereof, it will be understood by those skilled in the art that various changes in form and details may be made therein without departing from the spirit and scope of the invention.

Figure 5:
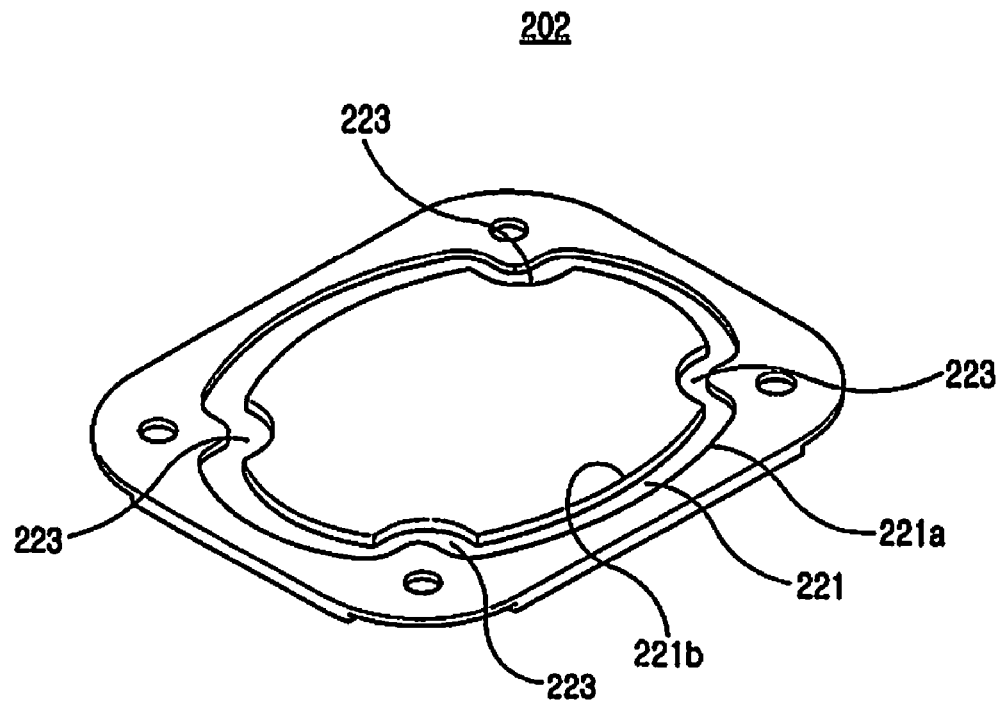
FIG. 5 is a perspective view of an other face of a guide plate shown in FIG. 4.
Figure 6:
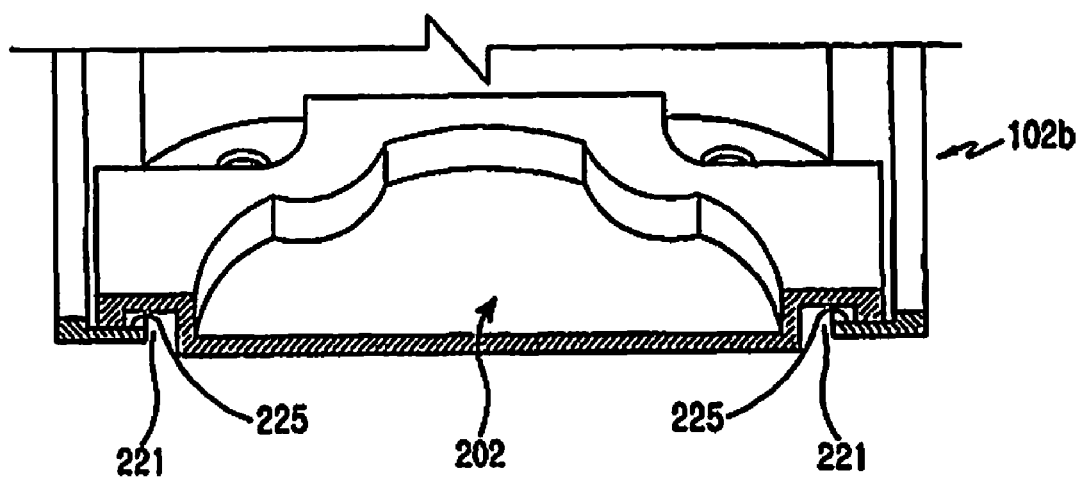
FIG. 6 is a cut perspective view showing a state in which a guide plate is combined with a second housing shown in FIG. 1.

For example, although the stopper grooves 223 have the same shape in FIG. 5, their shapes may vary. In other words, by increasing the gradient of the stopper groove 223, the second housing 102 can stably maintain its stopped state in spite of the elastic force of the elastic member 203 or an unintentional external force due to user's carelessness when the guide protrusion 201 is engaged with the stopper groove 223.

Moreover, the shape and type of the elastics member 203 may vary as long as it can provide the same stopping force or driving force as disclosed in the present invention. The stopped positions of the second housing 102 may differ according to the number and positions of stopper grooves 223.

The locus of the guide groove 221, the shapes, number, and positions of the stopper grooves 223, and the structure of the elastic member 203 can be changed variously by those skilled in the art to be suitably applied to actual products.

What is claimed is:

1. A portable terminal comprising:
a first housing;
a second housing combined with the first housing while facing the first housing;
a guide groove having a polygonal locus formed in a first face of the second housing;
a support protrusion formed in an area surrounded by the guide groove;
a guide plate mounted in an inner side face of the second housing;
a guide protrusion protruding from a top face of the first housing to be engaged with the guide groove and sliding within the guide groove; and
an elastic member having two free ends of which one free end is supported by the guide protrusion and an other free end is supported by the support protrusion,
wherein the elastic member provides a driving force for moving the guide protrusion to a vertex portion of the polygonal locus and the second housing translates about an axis perpendicular to the top face of the first housing while facing the first housing, thereby sequentially opening portions of the first housing and sequentially closing already opened portions of the first housing.

2. The portable terminal of claim 1, wherein the polygonal locus has a shape of one of a square and a diamond.

3. The portable terminal of claim 2, wherein the support protrusion is formed in a center of the polygonal locus and the elastic member provides an elastic force working in a direction that tends to move the free ends of the elastic member away from each other.

4. The portable terminal of claim 1, wherein vertexes of the polygonal locus are positioned at four positions that each position is spaced apart from an adjacent position by a same interval and each portion of the polygonal locus between every two adjacent vertexes is in an arc shape that is curved towards an inner side of the guide groove.

5. The portable terminal of claim 4, wherein the support protrusion is formed in the center of the polygonal locus and the elastic member provides an elastic force working in a direction that tends to move the free ends of the elastic member away from each other.

6. The portable terminal of claim 1, wherein vertexes of the polygonal locus are formed in six positions that each position is spaced apart from an adjacent position by a same interval.

7. The portable terminal of claim 6, wherein the polygonal locus is in a regular hexagonal shape, the support protrusion is formed in a center of the polygonal locus, and the elastic member provides an elastic force working in a direction that tends to move the free ends of the elastic member away from each other.

8. The portable terminal of claim 6, wherein each portion of the polygonal locus between every two adjacent vertexes is in an arc shape that is curved towards an outer side of the guide groove and the vertexes are curved towards an inner side of the polygonal locus.

9. The portable terminal of claim 8, wherein the support protrusion is formed in a center of the polygonal locus and the elastic member provides an elastic force working in a direction that tends to move the free ends of the elastic member towards each other.

10. The portable terminal of claim 1, wherein the guide protrusion comprises:
- a slider whose at least both sides are bounded by the guide groove to slide within the guide groove; and
- a connection axis extending from the slider and an end portion of the connection axis is fixed to the first housing.

11. The portable terminal of claim 1, wherein a virtual axis extends perpendicularly to the top face of the first housing from a position that passes through the support protrusion.

* * * * *